United States Patent
Sethi et al.

(10) Patent No.: US 12,519,859 B2
(45) Date of Patent: Jan. 6, 2026

(54) DETERMINING DATA MIGRATION STRATEGY IN HETEROGENEOUS EDGE NETWORKS

(71) Applicant: DELL PRODUCTS L.P., Round Rock, TX (US)

(72) Inventors: Parminder Singh Sethi, Punjab (IN); Lakshmi Saroja Nalam, Bangalore (IN); Malathi Ramakrishnan, Madurai (IN); Daniel L. Hamlin, Round Rock, TX (US); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/407,770

(22) Filed: Jan. 9, 2024

(65) Prior Publication Data

US 2025/0227154 A1    Jul. 10, 2025

(51) Int. Cl.
*H04L 67/148* (2022.01)
*H04L 41/0803* (2022.01)
*H04L 41/16* (2022.01)

(52) U.S. Cl.
CPC ........ *H04L 67/148* (2013.01); *H04L 41/0803* (2013.01); *H04L 41/16* (2013.01)

(58) Field of Classification Search
CPC .... H04L 67/148; H04L 41/0803; H04L 41/16
See application file for complete search history.

(56) References Cited

U.S. PATENT DOCUMENTS

| | | | |
|---|---|---|---|
| 10,355,989 | B1 | 7/2019 | Panchal et al. |
| 10,853,111 | B1 * | 12/2020 | Gupta ................. G06F 9/45558 |
| 2007/0288535 | A1 * | 12/2007 | Shitomi ................ G06F 3/0643 |
| 2018/0102985 | A1 * | 4/2018 | Byers ...................... H04L 47/80 |
| 2020/0351900 | A1 * | 11/2020 | Zhang ................... H04W 4/029 |
| 2021/0105435 | A1 | 4/2021 | Ritchey et al. |
| 2021/0294702 | A1 | 9/2021 | Guim Bernat et al. |
| 2022/0050722 | A1 | 2/2022 | Dugast et al. |
| 2022/0129329 | A1 | 4/2022 | Plotnikov et al. |
| 2023/0036132 | A1 | 2/2023 | Abdelwahab |
| 2023/0156826 | A1 | 5/2023 | Palermo et al. |
| 2024/0126615 | A1 * | 4/2024 | Nadathur ............ G06F 11/3433 |

* cited by examiner

*Primary Examiner* — Dhairya A Patel
*Assistant Examiner* — Eui H Kim
(74) *Attorney, Agent, or Firm* — Jackson Walker L.L.P.

(57) ABSTRACT

Techniques determining a data migration strategy in an edge network including a plurality of edge nodes is described. One example method includes determining a configuration for each of the plurality of edge nodes in the edge network; predicting a future workload associated with each of the plurality of edge nodes in the edge network based on an observed past workload for each of the plurality of edge nodes; receiving a migration request for a particular edge node in the plurality of edge nodes; and identifying a target edge node in the plurality of edge nodes that is suitable for handling the predicted future workload of the particular edge node, wherein the identifying is based at least in part on the determined configuration of the particular edge node and the target edge node, and on the predicted future workload of the particular edge node and the target edge node.

5 Claims, 3 Drawing Sheets

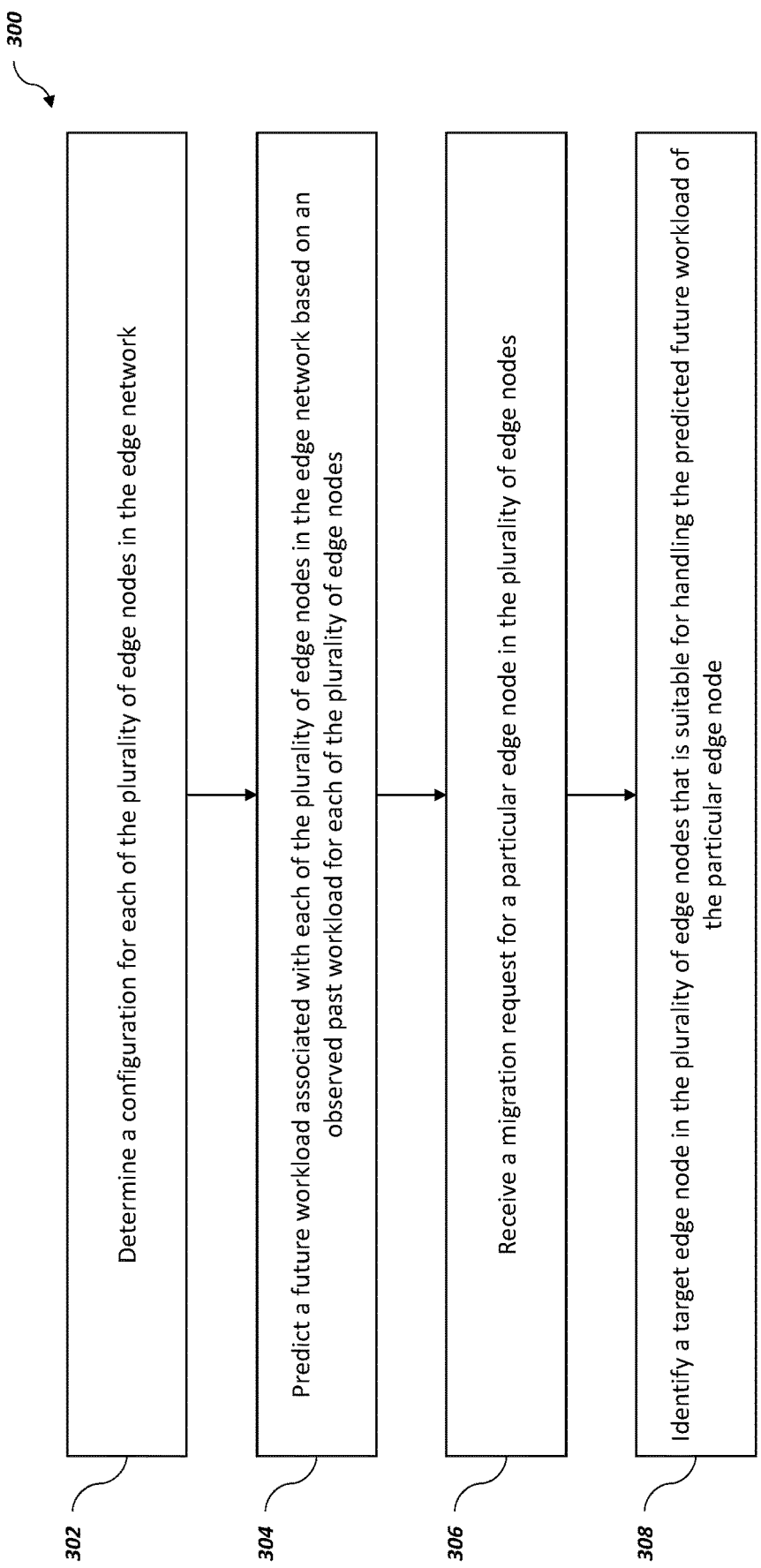

– – 
DETERMINING DATA MIGRATION STRATEGY IN HETEROGENEOUS EDGE NETWORKS

TECHNICAL FIELD

The present disclosure relates in general to information handling systems, and more particularly to techniques for management of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In many HCI implementations, an administrator may use a centralized management system (e.g., a cloud-based system, or in general any information handling system communicatively coupled to the HCI nodes via a network). The centralized management system may communicate with HCI nodes individually to perform various management tasks such as provisioning, monitoring, upgrading, etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, a method for determining a data migration strategy in an edge network including a plurality of edge nodes is described, and includes determining, by a computing device, a configuration for each of the plurality of edge nodes in the edge network; predicting, by the computing device, a future workload associated with each of the plurality of edge nodes in the edge network based on an observed past workload for each of the plurality of edge nodes; receiving, by the computing device, a migration request for a particular edge node in the plurality of edge nodes; and identifying, by the computing device, a target edge node in the plurality of edge nodes that is suitable for handling the predicted future workload of the particular edge node, wherein the identifying is based at least in part on the determined configuration of the particular edge node and the target edge node, and on the predicted future workload of the particular edge node and the target edge node.

In some cases, predicting the future workload is performed using a neural network model trained on past workload data associated with the plurality of edge nodes.

In some implementations, the neural network model is a Multi-Layer Perceptron (MLP).

In some cases, identifying the target edge node includes identifying a neighbor edge node of the particular edge node as the target edge node, wherein the neighbor edge node is co-located with the particular edge node.

In some cases, the plurality of edge nodes include one or more neighbor nodes co-located with the particular edge node and one or more fog nodes communicatively coupled to the particular edge node, and wherein identifying the target edge node includes: determining, by the computing device, that the one or more neighbor nodes are not suitable for handling the predicted future workload of the particular edge node; and in response, identifying, by the computing device, a particular fog node of the one or more fog nodes as the target edge node.

In some implementations, the plurality of edge nodes include one or more neighbor nodes co-located with the particular edge node, one or more fog nodes communicatively coupled to the particular edge node, and wherein identifying the target edge node includes: determining, by the computing device, that the one or more neighbor nodes and the one or more fog nodes are not suitable for handling the predicted future workload of the particular edge node; in response, identifying, by the computing device, a cloud node from a plurality of cloud nodes in a cloud network as the target edge node, wherein the plurality of cloud nodes are distinct from the plurality of edge nodes, and wherein the cloud network is distinct from the edge network.

In some cases, the determined configuration for each particular edge node includes a processor type, a set of applications associated with the particular edge node, a set of neighbor nodes for the particular edge node, a set of fog nodes for the particular edge node, a security level, a device category, and a device criticality level.

In accordance with embodiments of the present disclosure, a system for determining a data migration strategy in an edge network including a plurality of edge nodes is described, and includes a migration engine including at least one processor and a memory and configured to perform operations including: determining a configuration for each of the plurality of edge nodes in the edge network; predicting a future workload associated with each of the plurality of edge nodes in the edge network based on an observed past workload for each of the plurality of edge nodes; receiving a migration request for a particular edge node in the plurality of edge nodes; and identifying a target edge node in the plurality of edge nodes that is suitable for handling the predicted future workload of the particular edge node, wherein the identifying is based at least in part on the determined configuration of the particular edge node and the target edge node, and on the predicted future workload of the particular edge node and the target edge node.

In accordance with embodiments of the present disclosure, an article of manufacture is described comprising a non-transitory, computer-readable medium having computer-executable instructions thereon that are executable by a processor to perform operations for determining a data migration strategy in an edge network including a plurality of edge nodes, the operations comprising: determining a configuration for each of the plurality of edge nodes in the edge network; predicting a future workload associated with each of the plurality of edge nodes in the edge network based on an observed past workload for each of the plurality of edge nodes; receiving a migration request for a particular edge node in the plurality of edge nodes; and identifying a target edge node in the plurality of edge nodes that is suitable for handling the predicted future workload of the particular edge node, wherein the identifying is based at least in part on the determined configuration of the particular edge node and the target edge node, and on the predicted future workload of the particular edge node and the target edge node.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a block diagram of another example of an information handling system, in accordance with embodiments of the present disclosure.

DETAILED DESCRIPTION

In an edge network, data is processed and stored by computers ("edge nodes") located physically closer to users and devices that will use the data (the network edge) as opposed to centralized computers in a cloud computing system. Each particular edge node in an edge network may communicate with a set of neighbor edge nodes that may be directly connected to particular node, physically co-located with the particular node, located relatively near the particular node, or otherwise configured such that communication between the particular edge node and its neighbor edge nodes is relatively fast. Each particular edge node in an edge network may also communicate with a wider set of edge nodes referred to as a "fog," which may include, for example, additional edge nodes that are not neighbor nodes, but that are nonetheless located at the network edge and thus distinct from a centralized cloud computing system. Such edge networks can be homogeneous (consisting of edge nodes with identical or similar hardware configurations, applications, etc.), or heterogeneous (consisting of edge nodes with different hardware configurations, applications, etc.).

During operation of an edge network, it may become necessary to migrate the data processing performed by a particular edge node to another edge node, such as, for example, in the event the particular edge node has reached its End-Of-Life (EOL), or when a need arises to move the data processing to a higher performance node. Because an edge network may include a large number of edge nodes, possibly with many different configurations and data processing workloads, such a migration can be problematic. For example, migrating the particular edge node's data processing workload to a new edge node with a different hardware configuration could adversely affect the performance of the edge network in the event that the new edge node is unable to handle the migrated workload. Further, the processing workload of each node in the network may vary significantly over time, making it difficult to assess or predict the required processing capacity of the new node when performing a migration.

Figure 1:
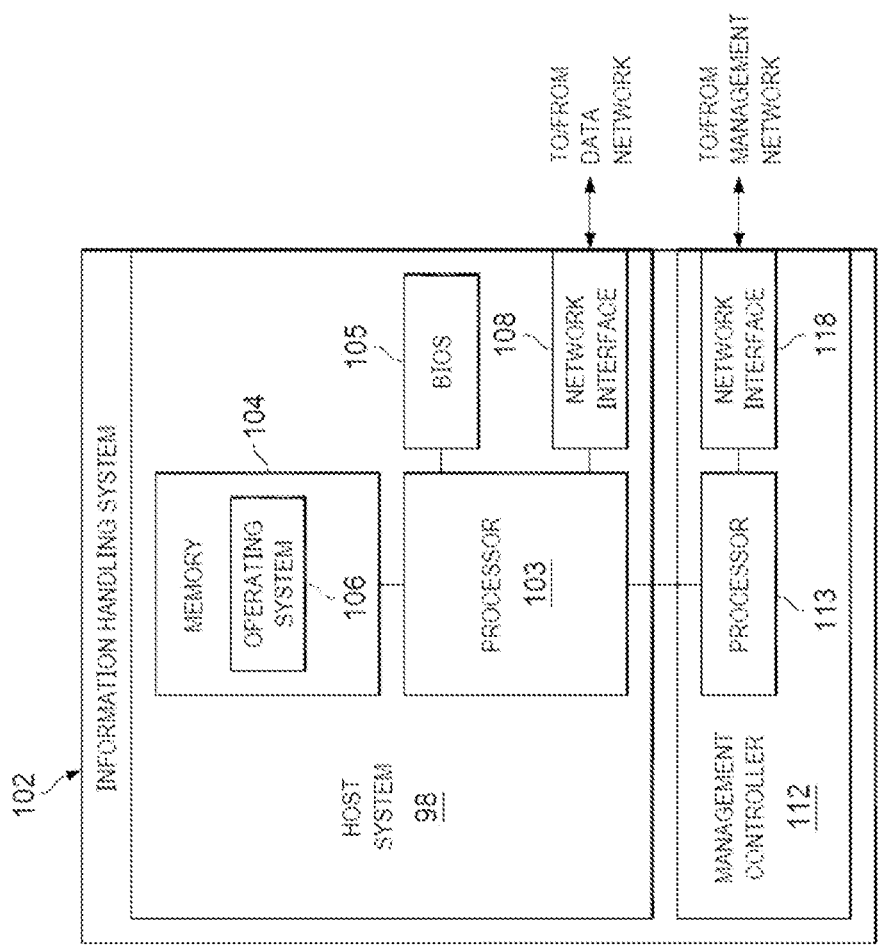
FIG. 1 illustrates a block diagram of an example information handling system, in accordance with embodiments of the present disclosure.
Figure 2:
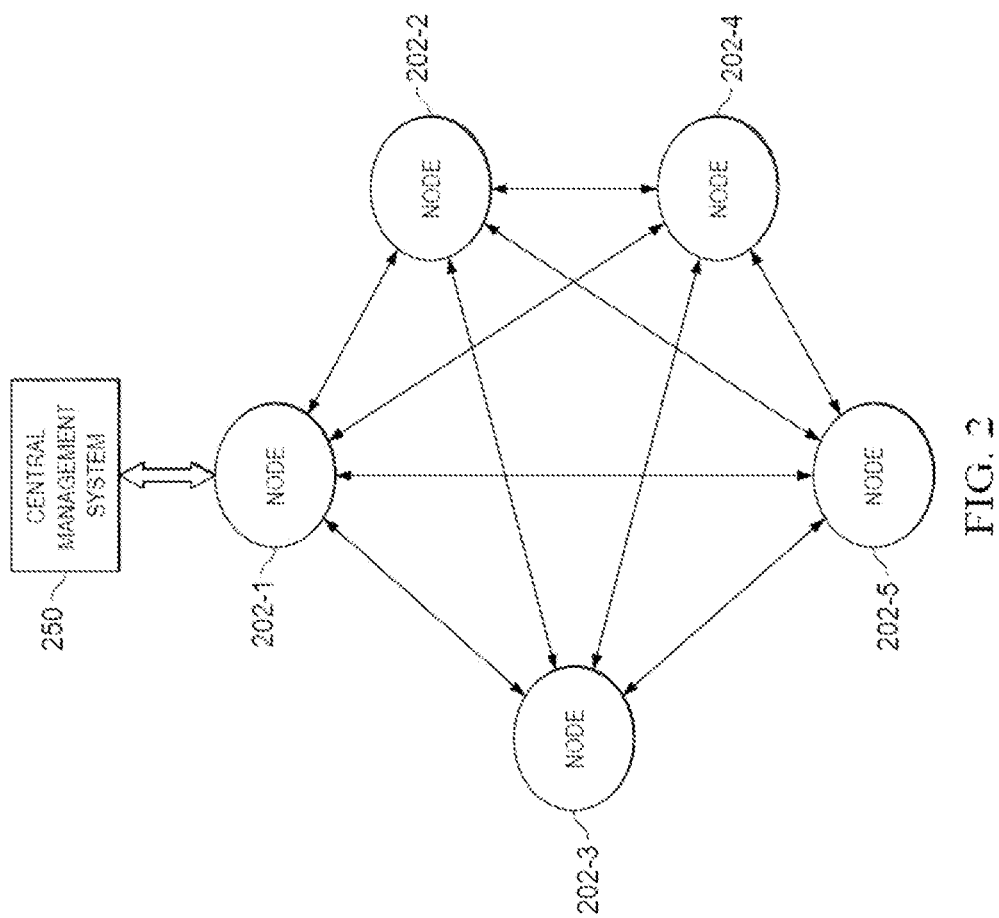
FIG. 2 illustrates a block diagram of an example of an information handling system, in accordance with embodiments of the present disclosure.

The present disclosure describes techniques for determining a data migration strategy in heterogeneous edge networks that address the issues discussed above. Preferred embodiments and their advantages are best understood by reference to the FIGURES, wherein like numbers are used to indicate like and corresponding parts. FIGS. 1 and 2 and the associated descriptions below describe generic features of an information handling system such as the edge environment discussed above. FIG. 3 and its associated description describe techniques for determining a data migration strategy in heterogeneous edge networks, such as those depicted in FIGS. 1 and 2.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in management of information handling systems 102 (e.g., edge nodes). It should be noted that while the scenario of an edge deployment is discussed in detail herein for the sake of concreteness, other embodiments are also specifically contemplated within the scope of this disclosure.

In particular, embodiments may employ distributed autonomous edge nodes to assist the centralized management system in performing its management tasks. The centralized management system may communicate with a subset of the edge nodes (e.g., one or more of the edge nodes at each edge deployment) instead of communicating directly with every edge node. Members of this subset may then autonomously communicate with their "neighbors" (e.g., other systems within the same edge deployment) to carry out the management tasks.

By performing status checks and/or distributing management instructions (e.g., configuration changes, updates, etc.) with their neighbors autonomously, the subset of the edge nodes may synchronize configurations across the whole edge deployment and/or the whole HCI system without the need for the centralized management system to communicate directly with every edge node.

In one embodiment, the specific number of neighbors that should be managed by a given edge node in the subset can be calculated by a mathematic model to fit the system's design requirements. In other embodiments, the number of neighbors managed by a given edge node in the subset may be hard-coded or provided as a variable that an administrator may set.

Embodiments may thus provide distributed system management for a large number of edge computing systems. Health checks may be carried out by neighbors in one or more large edge deployments, avoiding the necessity for each edge node to be checked directly by the centralized management system. Configuration changes and updates may also be synchronized between neighbors in large edge deployments, avoiding the necessity for such changes to be provided directly by the centralized management system.

Turning now to FIG. 2, an example architecture is shown for autonomous management of information handling systems. As shown, edge nodes 202-1 through 202-5 (collectively, nodes 202) are communicatively coupled to one another (e.g., via a local edge deployment network). They may also be communicatively coupled to central management system 250 (e.g., via the internet).

In one embodiment, central management system 250 may communicate directly with node 202-1 to perform monitoring and management tasks. The other nodes 202 may communicate (directly or indirectly) with node 202-1, which may act as a portal for status and management information. For example, the other nodes may transmit status information to node 202-1, which may aggregate the information and pass it along to central management system 250. Updates and other management instructions may likewise be sent from central management system 250 to node 202-1, which may distribute them to the other nodes 202.

The communication between node 202-1 and the other nodes 202 may be either direct or indirect. For example, node 202-4 may communicate directly with node 202-1, or it may communicate with node 202-2, which may pass information along to node 202-1.

In one embodiment, each communication may include a time stamp associated therewith to indicate the time of origination. In this way, nodes 202 may determine the order in which instructions were issued, such that later instructions may supersede earlier instructions, etc. Time stamps may further be employed to reduce unnecessary duplication of communications. For example, if one node has broadcast a message to its neighbor nodes, and one of those nodes has already transmitted the message to central management system 250 at a particular time, then the other nodes need not retransmit the message at a later time.

In one embodiment, the arrangement of FIG. 2 may allow neighbors to perform health checks autonomously on one another in the event that communication is lost between central management system 250 and nodes 202. For example, if communication is interrupted between central management system 250 and node 202-1, then central management system 250 may contact node 202-5 and instruct it to perform the functionality previously handled by node 202-1. For example, node 202-5 may then perform health checks, heartbeat monitoring, and other tasks with regard to itself and the other nodes 202, reporting the results to central management system 250.

In one embodiment, this may be triggered based on a lack of communications between node 202-1 and central management system 250 that lasts more than a threshold amount of time. The threshold may be calculated based on a mathematic model that takes into account the characteristics of the node deployment. In other embodiments, the threshold may be hard-coded or provided as a variable that an administrator may set. In one implementation, the communication frequency and timing may incorporate a random or pseudo-random element, such that communications are staggered to avoid overwhelming the network infrastructure.

Turning now to FIG. 3, an example process 300 is shown for determining a data migration strategy in an edge network including a plurality of edge nodes. In some implementations, the process 300 may be performed by a computing device communicatively coupled to the edge network, such as a server or other device.

At 302, a configuration is determined for each of the plurality of edge nodes in the edge network. In some implementations, the determined configuration for each particular edge node may include a processor type, a set of applications associated with the particular edge node, a set of neighbor nodes for the particular edge node, a set of fog nodes for the particular edge node, a security level, a device category, and a device criticality level. The configuration may be determined, for example, based on querying each edge node for its current configuration, for example using a standard network protocol such as Simple Network Management Protocol (SNMP) or the like. The configuration may also be determined based on an external resource, such as a configuration database storing the configurations of the individual edge nodes.

At 304, a future workload associated with each of the plurality of edge nodes in the edge network is predicted. In some cases, this prediction is based on an observed past workload for each of the plurality of edge nodes. In some implementations, predicting the future workload is performed using a neural network model trained on past workload data associated with the plurality of edge nodes. The neural network model may be a Multi-Layer Perceptron (MLP) or other type of model.

At 306, a migration request for a particular edge node in the plurality of edge nodes is received. For example, a network operator may identify a particular edge node that has reached an end of life (EOL) condition, and may request that a migration plan be generated so that the particular edge node can be removed from the edge network.

At 308, a target edge node in the plurality of edge nodes that is suitable for handling the predicted future workload of the particular edge node is identified. In some cases, the identifying is based at least in part on the determined configuration of the particular edge node and the target edge node, and on the predicted future workload of the particular edge node and the target edge node. A target edge node may be identified as suitable for handling a predicted future workload if, for example, its determined configuration indicates that it has sufficient hardware resources to handle the future workload of the particular edge node in addition to its own future workload. Identifying the target edge node may include identifying a neighbor edge node of the particular edge node as the target edge node, wherein the neighbor edge node is co-located with the particular edge node.

In some cases, the plurality of edge nodes include one or more neighbor nodes co-located with the particular edge node and one or more fog nodes communicatively coupled to the particular edge node, and identifying the target edge node includes determining that the one or more neighbor nodes are not suitable for handling the predicted future workload of the particular edge node. In response to such a determination, a particular fog node of the one or more fog nodes may be identified as the target edge node.

In some cases, it may be determined that the one or more neighbor nodes and the one or more fog nodes are not suitable for handling the predicted future workload of the particular edge node. In response, a cloud node from a plurality of cloud nodes in a cloud network may be identified as the target edge node. The plurality of cloud nodes may be distinct from the plurality of edge nodes, and the cloud network may be distinct from the edge network.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for determining a data migration strategy in an edge network including a plurality of edge nodes, the method comprising:

determining, by a computing device, a configuration for each of the plurality of edge nodes in the edge network; predicting, by the computing device, a future workload associated with each of the plurality of edge nodes in the edge network based on an observed past workload for each of the plurality of edge nodes, wherein predicting the future workload is performed using a Multi-Layer Perceptron (MLP) neural network model trained on past workload data associated with the plurality of edge nodes;

receiving, by the computing device, a migration request for a particular edge node in the plurality of edge nodes to migrate a workload of the particular edge node, wherein the migration request is based on a determination that the particular edge node has reached end-of-life (EOL), and wherein the plurality of edge nodes includes one or more neighbor nodes that are co-located with the particular edge node and one or more fog nodes that are distinct from the neighbor nodes; and identifying, by the computing device, a target node that is suitable for handling the predicted future workload of the particular edge node, wherein the identifying is based at least in part on the determined configuration of the particular edge node and the target node, and on the predicted future workload of the particular edge node and the target node;

wherein identifying the target node includes:

determining that the one or more neighbor nodes are not suitable for handling the predicted future workload of the particular edge node;

in response to the one or more neighbor nodes not being suitable, determining that the one or more fog nodes are not suitable for handling the predicted future workload of the particular edge node;

in response to the one or more fog nodes not being suitable, identifying a cloud node from a plurality of cloud nodes in a cloud network as the target node, wherein the plurality of cloud nodes are distinct from the plurality of edge nodes, and wherein the cloud network is distinct from the edge network; and in response to identifying the target node, generating the data migration strategy to migrate the workload of the particular edge node to the identified target node and to remove the particular edge node from the edge network.

2. The method of claim 1, wherein the determined configuration for each particular edge node includes a processor type, a set of applications associated with the particular edge node, a set of neighbor nodes for the particular edge node, a set of fog nodes for the particular edge node, a security level, a device category, and a device criticality level.

3. A system for determining a data migration strategy in an edge network including a plurality of edge nodes, the system comprising:

a migration engine including at least one processor and a memory and configured to perform operations including:

determining a configuration for each of the plurality of edge nodes in the edge network;

predicting a future workload associated with each of the plurality of edge nodes in the edge network based on an observed past workload for each of the plurality of edge nodes, wherein predicting the future workload is performed using a Multi-Layer Perceptron (MLP) neural network model trained on past workload data associated with the plurality of edge nodes;

receiving a migration request for a particular edge node in the plurality of edge nodes to migrate a workload of the particular edge node, wherein the migration request is based on a determination that the particular edge node has reached end-of-life (EOL), and wherein the plurality of edge nodes includes one or more neighbor nodes that are co-located with the particular edge node and one or more fog nodes that are distinct from the neighbor nodes; and identifying a target node that is suitable for handling the predicted future workload of the particular edge node, wherein the identifying is based at least in part on the determined configuration of the particular edge node and the target node, and on the predicted future workload of the particular edge node and the target node;

wherein identifying the target node includes:

determining that the one or more neighbor nodes are not suitable for handling the predicted future workload of the particular edge node;

in response to the one or more neighbor nodes not being suitable, determining that the one or more fog nodes are not suitable for handling the predicted future workload of the particular edge node;

in response to the one or more fog nodes not being suitable, identifying a cloud node from a plurality of cloud nodes in a cloud network as the target node, wherein the plurality of cloud nodes are distinct from the plurality of edge nodes, and wherein the cloud network is distinct from the edge network; and in response to identifying the target node, generating the data migration strategy to migrate the workload of the particular edge node to the identified target node and to remove the particular edge node from the edge network.

4. The system of claim 3, wherein the determined configuration for each particular edge node includes a processor type, a set of applications associated with the particular edge node, a set of neighbor nodes for the particular edge node, a set of fog nodes for the particular edge node, a security level, a device category, and a device criticality level.

5. An article of manufacture comprising a non-transitory, computer-readable medium having computer-executable instructions thereon that are executable by a processor to perform operations for determining a data migration strategy in an edge network including a plurality of edge nodes, the operations comprising:

determining a configuration for each of the plurality of edge nodes in the edge network;

predicting a future workload associated with each of the plurality of edge nodes in the edge network based on an observed past workload for each of the plurality of edge nodes, wherein predicting the future workload is performed using a Multi-Layer Perceptron (MLP) neural network model trained on past workload data associated with the plurality of edge nodes;

receiving a migration request for a particular edge node in the plurality of edge nodes to migrate a workload of the particular edge node, wherein the migration request is based on a determination that the particular edge node has reached end-of-life (EOL), and wherein the plurality of edge nodes includes one or more neighbor nodes that are co-located with the particular edge node and one or more fog nodes that are distinct from the neighbor nodes; and identifying a target node that is suitable for handling the predicted future workload of the particular edge node, wherein the identifying is based at least in part on the determined configuration of the particular edge node and the target node, and on the predicted future workload of the particular edge node and the target node;

wherein identifying the target node includes:

determining that the one or more neighbor nodes are not suitable for handling the predicted future workload of the particular edge node;

in response to the one or more neighbor nodes not being suitable, determining that the one or more fog nodes are not suitable for handling the predicted future workload of the particular edge node;

in response to the one or more fog nodes not being suitable, identifying a cloud node from a plurality of cloud nodes in a cloud network as the target node, wherein the plurality of cloud nodes are distinct from the plurality of edge nodes, and wherein the cloud network is distinct from the edge network; and in response to identifying the target node, generating the data migration strategy to migrate the workload of the particular edge node to the identified target node and to remove the particular edge node from the edge network.

* * * * *